US007929465B2

(12) United States Patent
Parker et al.

(10) Patent No.: US 7,929,465 B2
(45) Date of Patent: Apr. 19, 2011

(54) METHOD OF PROVIDING DIGITAL DATA SERVICE TO USERS OF VIDEO TELEPHONY CALLS

(75) Inventors: Benjamin J. Parker, Overland Park, KS (US); Shane R. Werner, Olathe, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1418 days.

(21) Appl. No.: 11/138,573

(22) Filed: May 26, 2005

(65) Prior Publication Data
US 2005/0220084 A1    Oct. 6, 2005

Related U.S. Application Data

(63) Continuation of application No. 10/274,736, filed on Oct. 21, 2002, now Pat. No. 6,947,411.

(51) Int. Cl.
*H04L 12/16* (2006.01)

(52) U.S. Cl. ............... 370/270; 370/271; 370/395.2; 709/218; 709/228; 709/231

(58) Field of Classification Search ............... 370/395.2, 370/395.31, 461; 709/217–219, 227–232; 382/128, 129, 130, 131, 132, 133, 134, 305
See application file for complete search history.

(56) References Cited

U.S. PATENT DOCUMENTS

| 5,764,916 A | 6/1998 | Busey et al. | |
|---|---|---|---|
| 5,949,763 A | 9/1999 | Lund | |
| 6,208,719 B1 * | 3/2001 | Lo et al. | 379/114.03 |
| 6,311,231 B1 * | 10/2001 | Bateman et al. | 379/265.09 |
| 6,337,858 B1 | 1/2002 | Petty et al. | |
| 6,370,137 B1 | 4/2002 | Lund | |
| 6,544,198 B2 * | 4/2003 | Chong et al. | 600/586 |
| 6,614,780 B2 * | 9/2003 | Hakim et al. | 370/352 |
| 6,757,898 B1 * | 6/2004 | Ilsen et al. | 709/203 |
| 2001/0054064 A1 * | 12/2001 | Kannan | 709/203 |

FOREIGN PATENT DOCUMENTS

EP    1 059 798    12/2000

OTHER PUBLICATIONS

Andrew J. Klosterman and Gregory R. Ganger, *Secure Continuous Biometric-Enhanced Authentication*, May 2000.
Gregory R. Ganger, *Authentication Confidences*, Apr. 2001.

* cited by examiner

*Primary Examiner* — Jayanti K Patel
*Assistant Examiner* — Bo Hui A Zhu

(57) ABSTRACT

A communications and database delivery service within an internetwork interacts with a service provider and its requestors/customers. A server is maintained for storing requester identifiers and service provider identifiers. A records database is maintained for storing records of digital information for customers of the service provider in accordance with the requester identifiers. An initiation message is received from a requestor over the internetwork. A notification is sent of a requested two-way video session to an IP address corresponding to the service provider. After an acceptance is received from the service provider, signals are provided over the internetwork to enable the two-way video session between respective workstations of the requestor and the service provider. A respective record is retrieved from the records database corresponding to the requester. The respective record is forwarded to the IP address corresponding to the service provider.

16 Claims, 4 Drawing Sheets

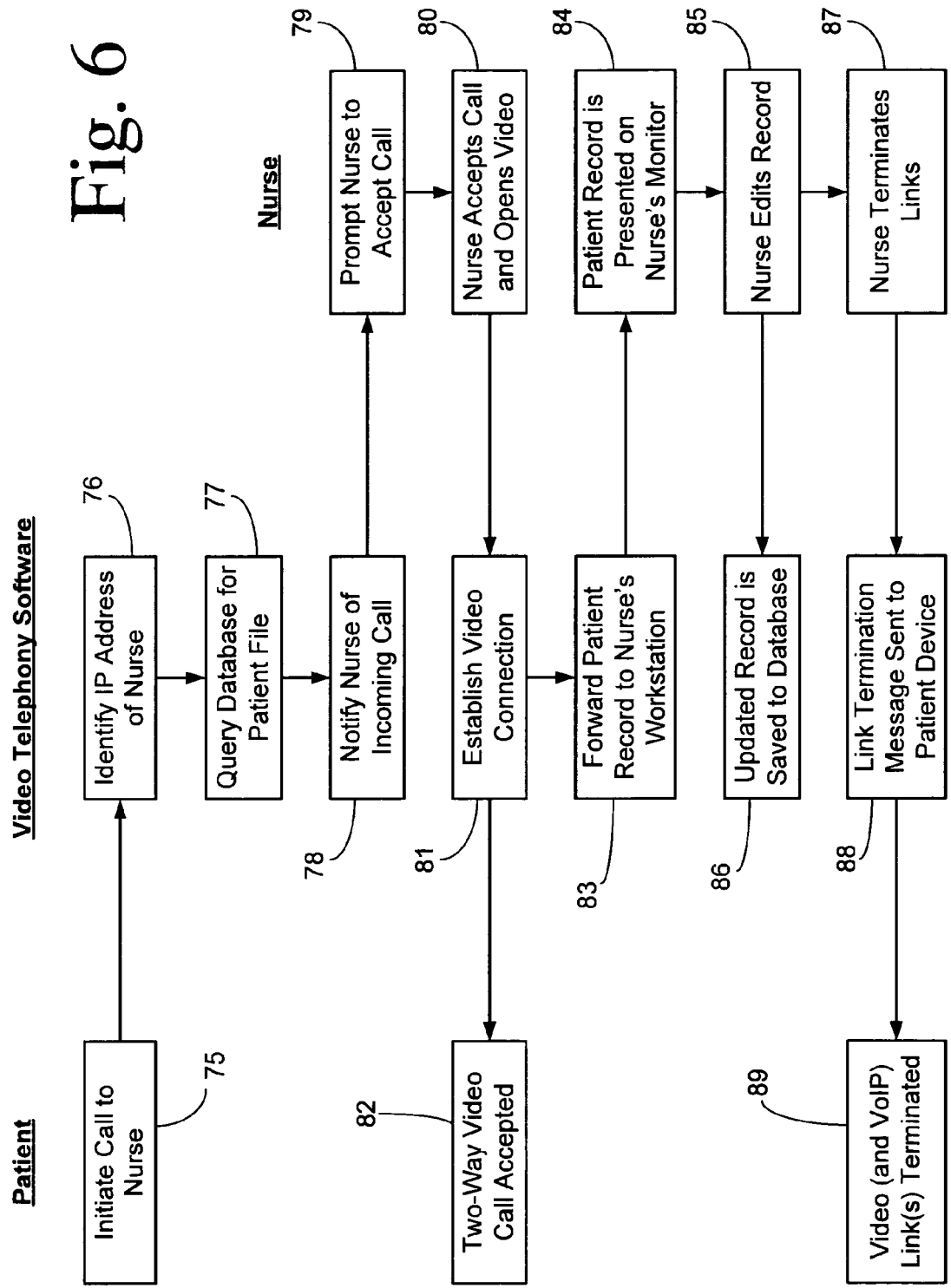

METHOD OF PROVIDING DIGITAL DATA SERVICE TO USERS OF VIDEO TELEPHONY CALLS

CROSS REFERENCE TO RELATED APPLICATIONS

This is a continuation application of U.S. application Ser. No. 10/274,736, filed Oct. 21, 2002, now U.S. Pat. No. 6,947, 411 entitled "Digital Data Communication System Using Video Telephony."

STATEMENT REGARDING FEDERALLY SPONSORED RESEARCH

Not Applicable.

BACKGROUND OF THE INVENTION

The present invention relates in general to providing services (e.g., medical care and supervision) of a service requester (e.g., medical patient) by a service provider not in the same immediate location, and, more specifically, to a method of operating an Internet-based video telephony and database system for conducting two-way video communications supplemented by presenting digital data records to a service provider automatically in response to a video telephony call.

In connection with providing medical care to patients, it is desirable to minimize the costs of care without compromising the quality of care. One manner of controlling costs is to treat a patient at home, thereby avoiding costs associated with a stay at a hospital. Regular nurse visitations and/or a caregiver on standby or "on-call" status are provided in order to attend to the needs of the home patient; however, the response time to react to an emergency medical situation is typically longer than when the patient is checked into a hospital.

In the context of hospitalization, costs can be reduced by controlling the size of the caregiving staff (e.g., nursing staff) to maximize the ratio of patients to caregiver. By maximizing the number of patients that can be handled by one caregiver, a greater cost reduction can be realized. Nevertheless, sufficient staff must be maintained to handle emergencies which may occur.

In a real or perceived emergency situation, a nurse or other caregiver needs to quickly establish communication (e.g., in-person communication or remote communication such as a telephone call or intercom) with the patient in order to assess their immediate needs, determine and administer an appropriate course of action, and to reassure the patient that any necessary care is forthcoming. An emergency alert may be manually initiated by a homebound patient placing a telephone call to a caregiver, by a patient pressing a call button in a hospital room, or by an automatic patient monitor detecting an alert condition. Once an emergency situation arises, the caregiver typically needs to 1) identify the patient, 2) retrieve the patient's charts or other records, 3) obtain any real-time monitoring or other information from the patient, 4) communicate any instructions or reassurances to the patient, 5) dispatch any needed assistance, and 6) update the patient's charts. A face-to-face visit (whether to a homebound patient or in a hospital room) is a relatively inefficient use of a caregiver's time, however, a conversation over an intercom or a telephone call can provide only limited audio information which may be inadequate to address certain situations.

In connection with routine telephone calls to a service provider (medical or non-medical) or any other non-emergency communications, it can often be expected that some file records or other digital information associated with the initiator of the communication (e.g., a calling party) will be needed by the provider in handling the communication. For example, when making a routine telephone call to a doctor's office, the handling of the call is typically lengthened by the need of a responder (e.g., nurse) to access a patient file (electronic or paper). The nurse or other provider must manually initiate the file retrieval since it depends upon first learning of the identity of the requester (e.g., calling party).

SUMMARY OF THE INVENTION

The present invention has the advantages of efficient deployment of medical caregiver or other service provider resources while increasing the quality and information content of communication in response to a request or an emergency alert signal. In particular, video telephony is coupled with automatic access to an electronic database of data records pertaining to the requester (e.g., patient) which are automatically displayed to the provider (e.g., caregiver). Thus, patient care and comfort are improved while the time required to make a medical assessment and the costs of providing service are reduced.

In one aspect of the invention, a method is provided for operating a communications and database delivery service within an internetwork wherein communications and database delivery services are provided to a service provider and its requestor customers. The service provider and each requester customer operates a respective workstation coupled to the internetwork. A server is maintained for storing requestor identifiers and service provider identifiers. A records database is maintained for storing records of digital information for customers of the service provider in accordance with the requestor identifiers. An initiation message is received from a requester over the internetwork, wherein the initiation message identifies the requestor and includes a service provider identifier for a corresponding service provider. A notification is sent of a requested two-way video session to an IP address corresponding to the service provider. An acceptance is received from the service provider. Signals are provided over the internetwork to enable the two-way video session between respective workstations of the requestor and the service provider. A respective record is retrieved from the records database corresponding to the requestor. The respective record is forwarded to the IP address corresponding to the service provider.

BRIEF DESCRIPTION OF THE DRAWINGS

FIG. 6 is a flowchart of a preferred method of patient to nurse communications using video telephony software.

DETAILED DESCRIPTION OF PREFERRED EMBODIMENTS

Figure 1:
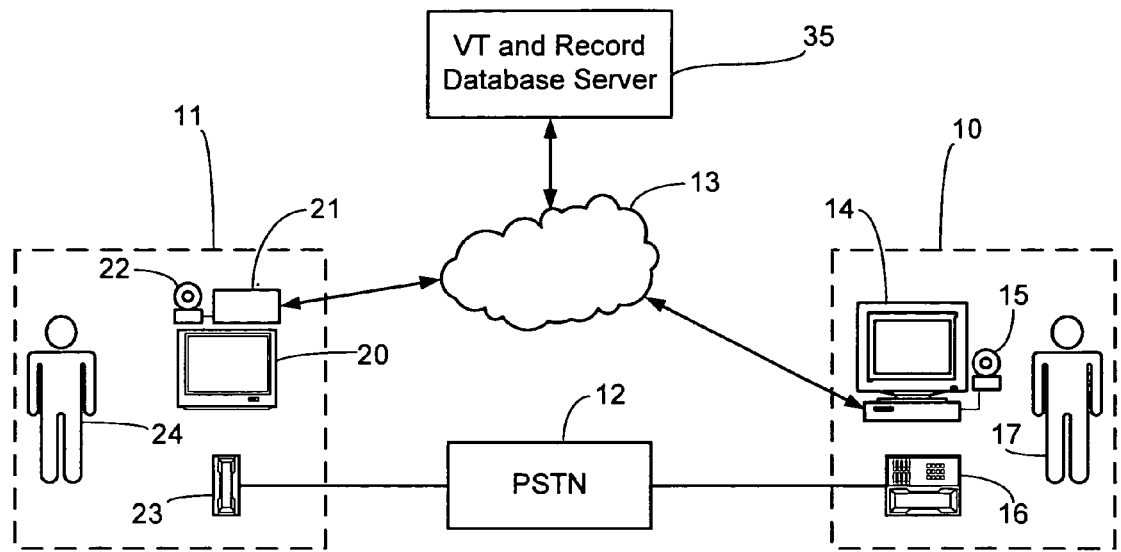
FIG. 1 is a block diagram of a first embodiment of a system of the present invention.

Referring to FIG. 1, the present invention includes audio and video communication links between a service provider workstation 10 and a remote location 11. Audio (e.g., voice) communication may take place via a telephone network, such as a public switched telephone network (PSTN) 12, and/or using computer telephony, such as Voice over IP (VoIP), transported over a data network 13 (e.g., the Internet). A video communication link is provided via data network 13.

Service provider workstation 10 comprises a network-enabled personal computer workstation 14 including various peripherals (such as a video camera 15) and a telephone 16 which are used by a service provider agent (e.g., nurse) 17. Remote location 11 may, for example, be at a private business or residence or may be a patient's room at a hospital. Location 11 includes a requester communication device for use by a requester 24. The communication device is computer network-enabled and may comprise a television monitor 20, a set-top box 21, a video camera 22, and a telephone 23. Set-top box 21 may include additional peripherals (not shown) and alternatively may comprise a personal computer workstation rather than a television monitor and set-top box.

The present invention may initiate video telephony communication sessions as described in U.S. application Ser. No. 10/033,813, filed Dec. 20, 2001, entitled "Telephonic Addressing For Establishing Simultaneous Voice and Computer Network Connections," and U.S. Pat. No. 6,545,697, issued Apr. 8, 2003, entitled "Video Telephony," both incorporated herein by reference in their entirety. Thus, an interconnection (not shown) between telephone 23 and set-top box 21 which may include a separate device (not shown) for capturing a dialed telephone number may be used. A video telephony and record database server 35 is provided for performing the functions of the central server as described in the prior applications. In addition, server 35 may be used to store and make available to service provider 17 digital data pertaining to requester 24, although such data records can also be stored elsewhere in the system (e.g., in a separate server connected to data network 13, in computer workstation 14, or in set-top box 21).

Computer workstation 14 and set-top box 21 have pre-assigned data network addresses (e.g., IP addresses) enabling them to exchange network packets or datagrams over data network 13. A video telephony session of the present invention establishes a video communication link between the respective data network addresses, possibly with server 35 relaying all packets between the two endpoints. When requester 24 initiates a video telephony session, its initiating IP address is, of course, known. Unless the IP address of the service provider workstation is pre-configured into set-top box 21 and then specifically selected by requester 24, it is determined using server 35. Thus, set-top box 21 may be pre-configured with an IP address (or URL) of server 35, and computer workstation 14 registers in advance with server 35 providing its telephone number and IP address. Server 35 maintains this information in a lookup table so that a video communication link can be established in response to a message from the requester's set-top box 21 providing the IP address of the set-top box and the telephone number of the service provider's workstation 10.

Figure 2:
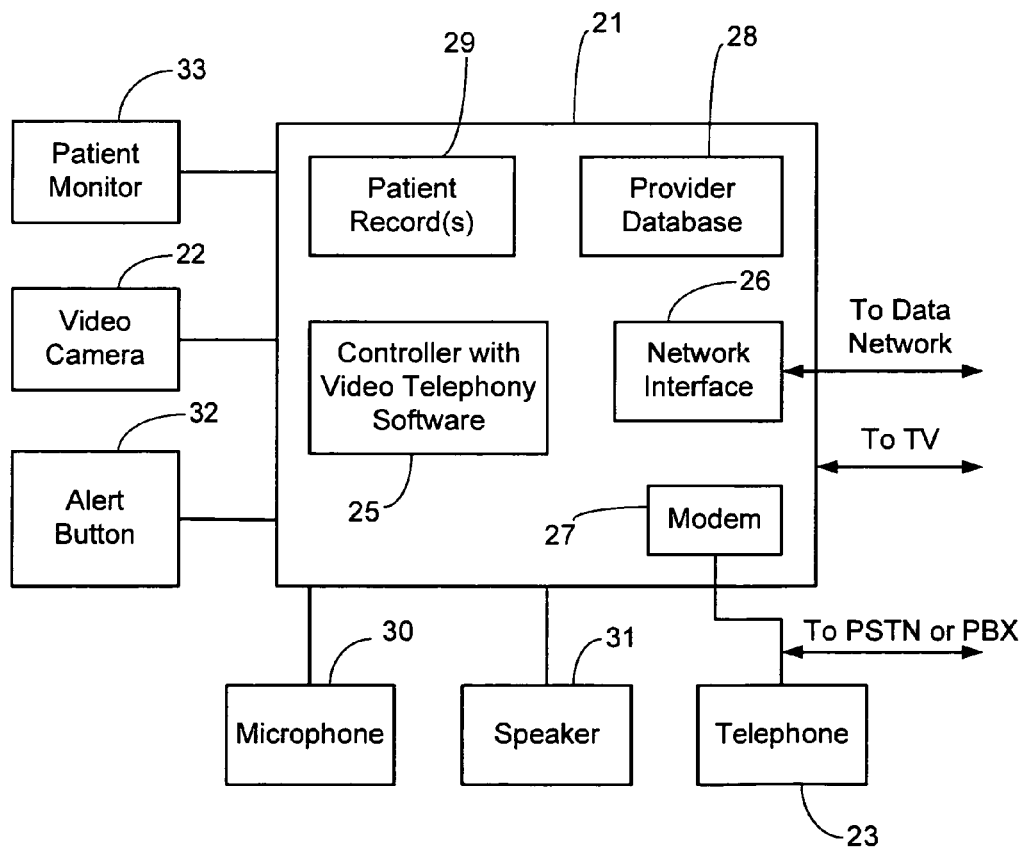
FIG. 2 is a block diagram of one preferred embodiment of a computer network-enabled patient communication device.

Customer premises equipment (CPE) at remote location 11 for providing patient-to-nurse communications is shown in greater detail in FIG. 2. Set-top box 21 includes a controller 25 for executing video telephony software. Controller 25 is responsive to a request (i.e., alert) signal for initiating a video communication link between the requester's communication device and the service provider workstation and for initiating display of a requester's data record at the service provider workstation. A network interface 26 couples set-top box 21 to the data network (e.g., through an Internet Service Provider).

Set-top box 21 also includes a modem 27 coupled to the telephone line of telephone 23. Modem 27 may be used to capture dialed digits from telephone 23 and make them available to the video telephony software so that a separate device does not have to be provided for that purpose. The recognition of a telephone number corresponding to a service provider automatically generates the request signal that launches the video link and data retrieval. Once the video link is established, video frames received from the service provider are displayed on television monitor 20.

Set-top box 21 may be preconfigured with a service provider database or identifier 28 which preferably may include the IP address or addresses of service providers (e.g. medical caregivers) if a network-based database of IP addresses is not being used.

The present invention allows any pertinent digital data to be retrieved and then presented to the service provider within a video telephony call. In the presently described embodiment of patient to medical caregiver communication, the digital data may be in the form of a patient medical chart or other electronically-stored digital file information. Many other beneficial uses are possible, such as retrieving account records when calling a financial institution, a utility company, or an insurance company. The digital information may be stored in a database that resides at either endpoint of the video telephony call or within a database server anywhere within the data network. As shown in FIG. 2, patient records 29 may be stored in set-top box 21. This embodiment is useful when records 29 are to be shared with various separate service providers.

In an alternate embodiment of the invention, a voice communication link may be provided within the data network rather than within a traditional telephone network. Therefore, a microphone 30 and a speaker 31 are coupled to set-top box 21 to provide two-way voice communication. In such an embodiment, wherein a telephone number is not dialed by the requester to complete a POTS call to the service provider, some other method is required for initiating a request signal and/or identifying the desired service provider. This can be done using an alert button 32 (such as an emergency alert button or a call button used in hospital rooms) to generate a request signal. If a set-top box is pre-configured to only establish a video telephony session with one service provider workstation, then the request signal need not contain any further information. If multiple service providers are used, then a selection among pre-identified service providers or entry of identifying information can be performed using a computer mouse or keyboard, for example.

In yet another alternative embodiment, a patient monitor 33 or other data sensor or collector is used to generate the digital data to be communicated (rather than retrieving from a pre-existing database). For example, real-time medical monitoring information can be acquired and transmitted in parallel with the video communication link. For instance, a home-bound patient may have a heart monitor that can be remotely accessed by a nurse via the IP data network, thereby providing critical diagnostic data to the nurse as soon as the alert request signal is generated. Furthermore, monitor 33 could detect an emergency condition and automatically generate an alert request signal itself.

Figure 3:
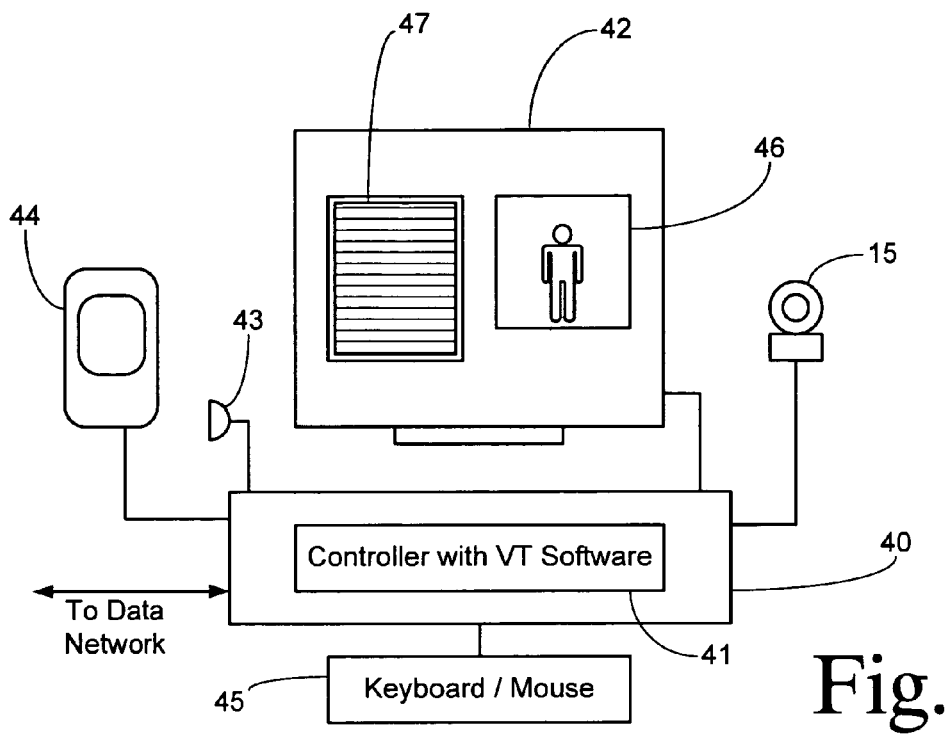
FIG. 3 is a block diagram of one preferred embodiment of a computer network-enabled service provider workstation.

Referring to FIG. 3, a service provider workstation is shown. A personal computer 40 includes a controller 41 for executing video telephony software. Coupled to computer 40 are a video monitor 42, a microphone 43, a speaker 44, an input device (e.g., a mouse and/or a keyboard) 45, and a video camera 15. When a video telephony session is in progress, the video telephony software generates a video window 46 for displaying video images of the requester received over the data network video communication link and a data window 47 for displaying the requester data record (e.g., received from the data network or from a local database in response to a requester ID that is received over the data network).

Figure 4:
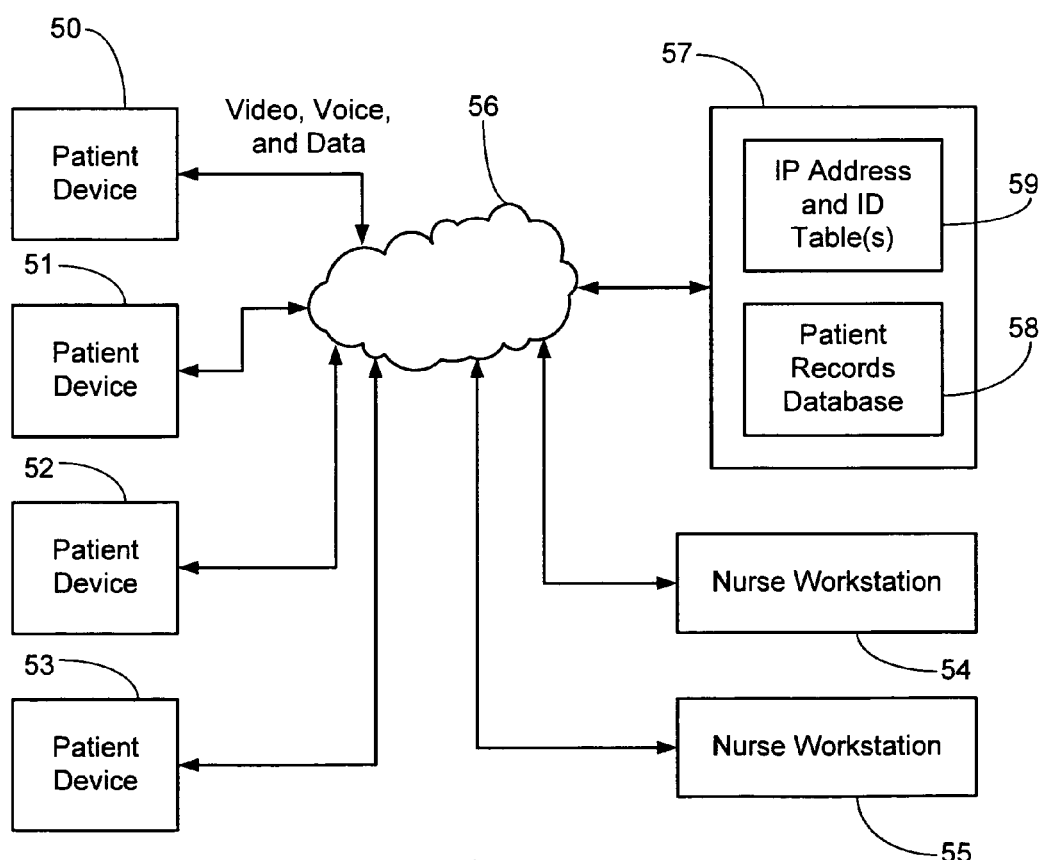
FIG. 4 is a block diagram of a system of the present invention for providing patient communications within a hospital.

FIG. 4 illustrates an embodiment of the present invention adapted for use in a hospital to allow a plurality of patient beds to be monitored from a nurse's station. Patient communication devices 50-53 are television/set-top box combinations or computer workstations deployed in association with respective patient beds in various hospital rooms for communicating with nurse workstations 54 and 55 (in practice, many more patient devices and nurse workstations would be deployed within a single hospital). All patient communication devices are connected to a data network 56 which may be a local area network (LAN). A server 57 is also connected to LAN 56 for serving a patient records database 58 and a database 59 storing tables providing IP addresses and patient ID's. Each patient device 50-53 preferably has a fixed IP address which is associated with each patient bed and/or room. When a particular patient is admitted to a particular bed, then a corresponding table 59 is updated with a patient ID corresponding to the admitted patient and which identifies the matching charts or other records in database 58 for that patient.

In this embodiment, both video and voice communication links may be established over LAN 56. When a patient initiates a request by pressing an alert or emergency button coupled to their patient device, a request message is sent to server 57. The request message includes a source IP address which identifies the corresponding patient communication device. Using that IP address, a patient ID for the patient assigned to a corresponding hospital bed or room is retrieved from table 59. Based on the patient ID, a data record (e.g., one or more computer files) is obtained from database 58. The IP address of a nurse's workstation assigned to provide caregiver services to the corresponding hospital bed may also be identified by consulting table 59 (assuming that there is more than one nurse workstation available). Using that IP address, video and voice communication links are established between the patient device initiating the request and the appropriate nurse's workstation. Once the IP addresses of the endpoints are determined, conventional VoIP may be launched to provide the voice channel.

Figure 5:
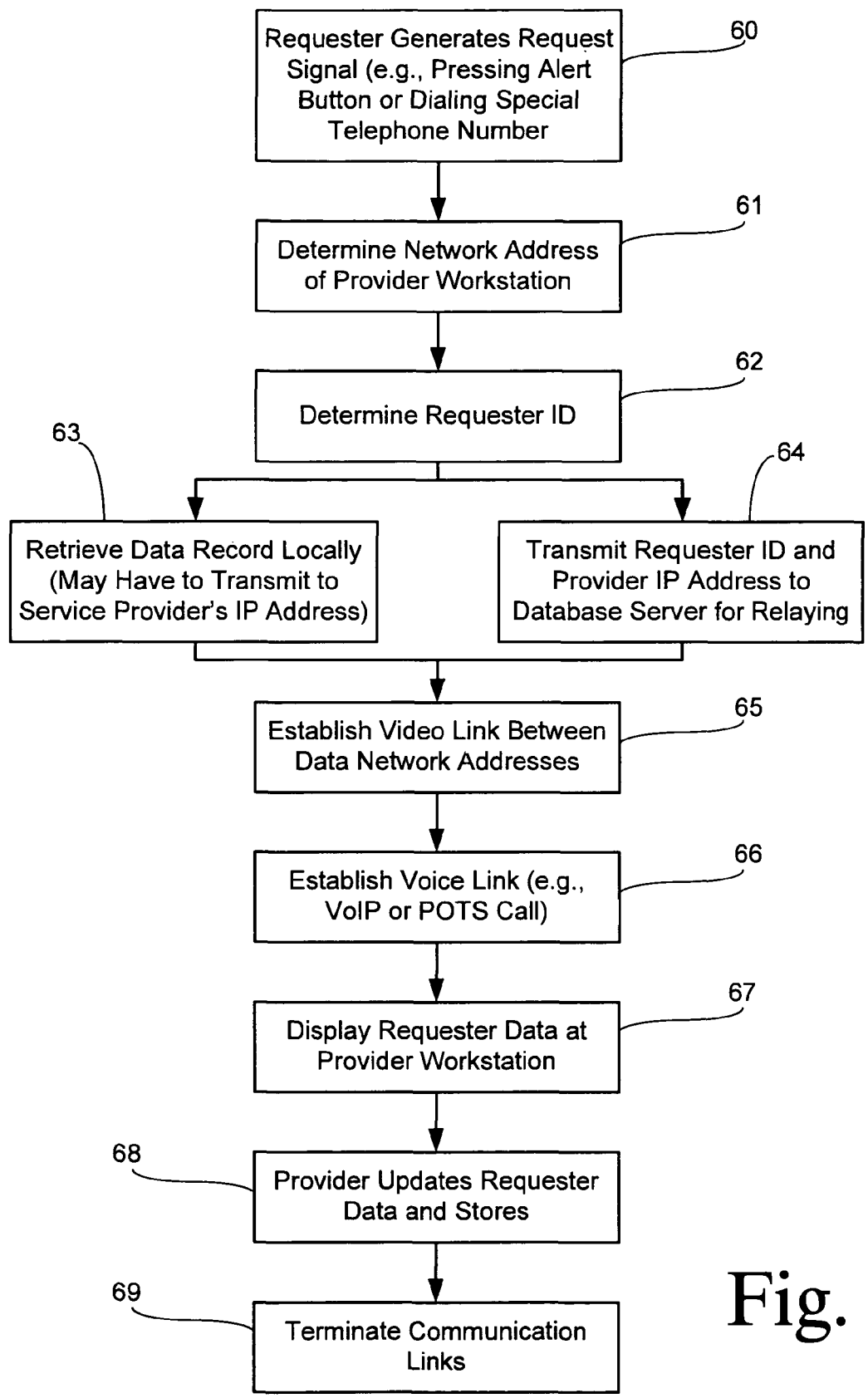
FIG. 5 is a flowchart of a preferred method of the present invention.

One preferred method of the invention is shown in FIG. 5. In step 60, the requester generates a request signal (e.g., by pressing an alert button or dialing a special telephone number for a service provider). The network address of the desired service provider workstation is determined in step 61. As previously described, the network address can be obtained by consulting a database that translates an identifier (such as a telephone number) into an IP address. Alternatively, the database may assign a service provider workstation as a function of the identity of the requester (e.g., all hospital beds on a particular floor are assigned to a nurse's workstation on that floor).

In step 62, a requester ID is determined. The requester ID may be pre-configured and automatically transmitted by the requester communication device, or may be determined as a result of a lookup table indexed by the IP address of the requester communication device, or may be supplied manually by the requester under control of the video telephony software, for example. The IP address of the requester device could also be used as the requester ID in some applications.

Depending upon the location of the database storing digital data pertinent to the requester, either step 63 or 64 may be performed. In step 63, the database is located locally at either the requester communication device or the service provider workstation, and, consequently, the appropriate data record is retrieved locally. If accessed by the requester communication device, the data record will be transmitted to the destination network address of the service provider workstation. If locally accessible at the service provider workstation, then a requester ID may be transmitted from the requester device (or a network server doing the requester identification) to the service provider workstation to identify the record to be retrieved.

If the data record is stored on a network server, then the requester ID is transmitted to the server in step 64 together with the IP address of the service provider workstation so that the retrieved data record can be relayed.

In step 65, a video link is established between video telephony software at the IP addresses of the requester device and provider workstation. A voice link is also established in step 66. The voice link may simply be established by the service provider answering an incoming telephone call from the requester. Alternatively, a VoIP connection may be established between the IP addresses in parallel with the video link.

In step 67, the requester data record is displayed on the service provider workstation, thereby supplementing the video and voice communication between the requester and the service provider with automatic generation of digital data to enhance the provision of services by the provider.

If any changes need to be made in the requester's data records as a result of the current call, the provider updates the data and then stores it back into the database in step 68. When a particular session is complete, the video and voice communication links are terminated in step 69. For example, the telephones may be hung up and the relaying of video data packets discontinued.

A particular application of the present invention to communication between a patient and a medical caregiver (e.g., a patient calling their doctor's office for information or advice) is shown in FIG. 6. At step 75, a patient uses a conventional telephone to initiate a conventional telephone call to a nurse. The IP address corresponding to computer equipment used by the nurse is identified by video telephony (VT) software in step 76. This may involve an interaction between a device for capturing a dialed telephone number and a server for storing registration data correlating telephone numbers and IP addresses.

In step 77, a patient records database is queried for a patient file. A notification message is sent to the nurse requesting a video link between the nurse's computer and the patient's computer or set-top box in step 78. In the meantime, the nurse's telephone also rings and a call may be answered. In step 79, the nurse's computer displays a prompt by which the incoming video call can be accepted, and an indication of the nurse's acceptance is made in step 80 (e.g., by clicking an icon).

In step 81, the video link is established and the patient accepts two-way video is step 82. In response to the acceptance of the video link, the VT software forwards the appropriate patient record to the nurse's computer in step 83. The patient record is presented on the monitor of the nurse's workstation in step 84. During display, the record may be edited by the nurse in step 85. An updated record is saved to the database in step 86.

At the end of providing services, the nurse terminates the video and voice links in step 87. A link termination message may be sent to the patient device by the VT software in step 88 and the links are terminated in step 89.

The present invention also contemplates a communication initiated by a service provider to a customer/patient/requester, requiring only straightforward modification of the database or tables mentioned for establishing the network session.

Since video cameras are present at each end of the video telephony call, many useful types of information can be included in the communication session. For example, a patient could show a vial of prescription medicine to a nurse via the video link. Furthermore, the prescription label may be barcoded to identify the medication, dosage, drug interactions, etc. The barcode could be interpreted by the nurse's workstation which would then automatically upload more complete information about the medication to the nurse's display.

What is claimed is:

1. A method of operating a communications and database delivery service within an internetwork wherein communications and database delivery services are provided to a medical caregiver and its requestor patients, wherein said medical caregiver and each requestor patient operates a respective workstation with a respective video camera and coupled to said internetwork, said method comprising the steps of:
   maintaining a server for storing patient identifiers and medical caregiver identifiers;
   maintaining a medical records database storing records of digital medical information supporting provision of a service to patients of said medical caregiver in accordance with said patient identifiers;
   receiving an initiation message from a patient over said internetwork, said initiation message identifying said patient and including a medical caregiver identifier for a corresponding medical caregiver;
   sending a notification of a requested two-way video session to an IP address corresponding to said medical caregiver;
   receiving an acceptance from said medical caregiver;
   providing signals over said internetwork to enable said two-way video session between respective workstations of said patient and said medical caregiver for exchanging video images from said video cameras;
   retrieving a respective medical record from said medical records database corresponding to said patient;
   forwarding said respective medical record to said IP address corresponding to said medical caregiver; and
   displaying at least a portion of said respective medical record at said medical caregiver workstation.

2. The method of claim 1 wherein said patient identifiers and said medical caregiver identifiers include respective IP addresses within said internetwork.

3. The method of claim 1 wherein said patient identifiers and said medical caregiver identifiers include respective telephone numbers within a voice network.

4. The method of claim 3 wherein said server includes a lookup table for translating a telephone number associated with said medical caregiver into said IP address corresponding to said medical caregiver.

5. The method of claim 1 wherein said server relays video data between said respective workstations of said patient and said medical caregiver throughout said two-way video session.

6. The method of claim 1 further comprising the step of:
   said server setting up a voice link between said respective workstations of said patient and said medical caregiver via said internetwork.

7. The method of claim 6 wherein said server relays voice data between said respective workstations of said patient and said medical caregiver for the duration of said voice link.

8. The method of claim 1 further comprising the steps of:
   receiving updated digital medical information from said medical caregiver during said two-way video session; and
   storing said updated digital medical information in said respective medical record corresponding to said patient.

9. A method of operating a communications and database delivery service within an internetwork wherein communications and database delivery services are provided to a medical caregiver and its patients, wherein said medical caregiver and each patient operates a respective workstation coupled to said internetwork, said method comprising the steps of:
   maintaining a server for storing patient identifiers and medical caregiver identifiers;
   maintaining a medical records database storing records of digital medical information supporting provision of a service to said patients of said medical caregiver in accordance with said patient identifiers;
   receiving an initiation message from a medical caregiver over said internetwork, said initiation message identifying said medical caregiver and including a patient identifier;
   sending a notification of a requested two-way video session to an IP address corresponding to said patient;
   receiving an acceptance from said patient;
   providing signals over said internetwork to enable said two-way video session between respective workstations of said patient and said medical caregiver;
   retrieving a respective medical record from said medical records database corresponding to said patient;
   forwarding said respective medical record to an IP address corresponding to said medical caregiver; and
   displaying at least a portion of said respective medical record at said medical caregiver workstation.

10. The method of claim 9 wherein said patient identifiers and said medical caregiver identifiers include respective IP addresses within said internetwork.

11. The method of claim 9 wherein said patient identifiers and said medical caregiver identifiers include respective telephone numbers within a voice network.

12. The method of claim 11 wherein said server includes a lookup table for translating a telephone number associated with said patient into said IP address corresponding to said patient.

13. The method of claim 9 wherein said server relays video data between said respective workstations of said patient and said medical caregiver throughout said two-way video session.

14. The method of claim 9 further comprising the step of:
   said server setting up a voice link between said respective workstations of said patient and said medical caregiver via said internetwork.

15. The method of claim 14 wherein said server relays voice data between said respective workstations of said patient and said medical caregiver for the duration of said voice link.

16. The method of claim 9 further comprising the steps of:
   receiving updated digital medical information from said medical caregiver during said two-way video session; and
   storing said updated digital medical information in said respective medical record corresponding to said patient.

* * * * *